R. C. SAYER.
CONNECTING BODIES.
APPLICATION FILED JULY 1, 1915.
1,287,454.
Patented Dec. 10, 1918.
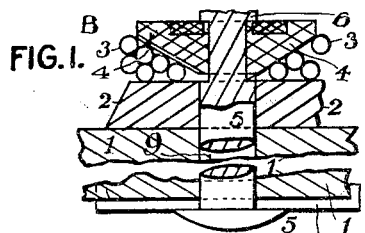
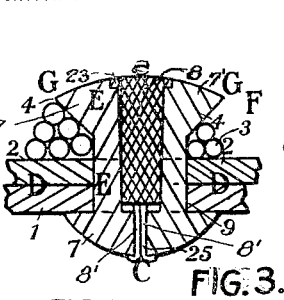
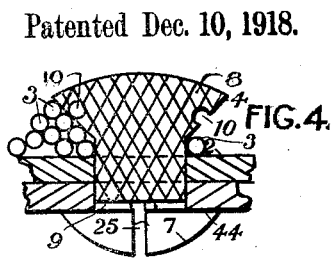
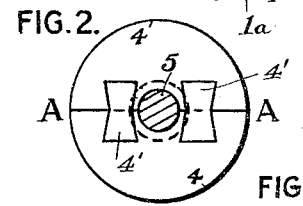
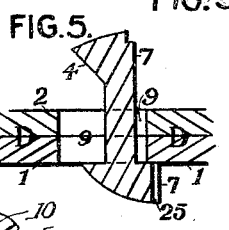
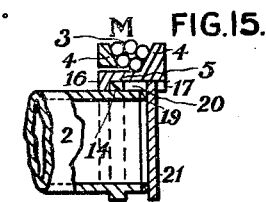
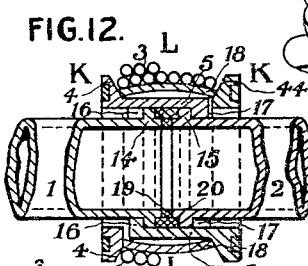
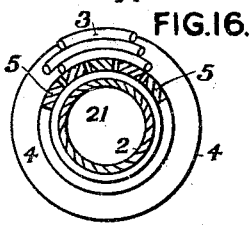
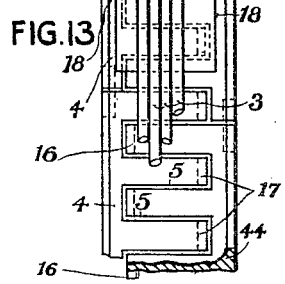
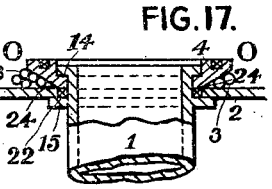
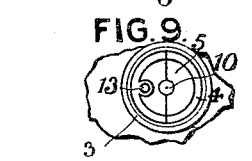
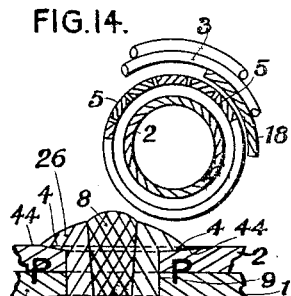
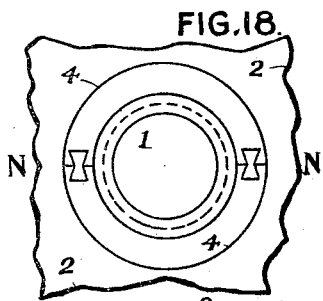
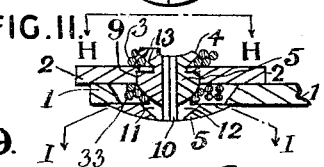
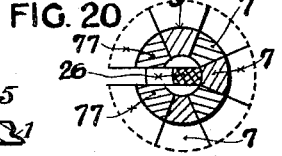
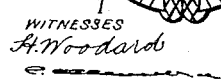
INVENTOR
Robert C. Sayer
WITNESSES
H. Woodard
BY
ATTORNEYS

UNITED STATES PATENT OFFICE.

ROBERT COOKE SAYER, OF REDLAND, ENGLAND.

CONNECTING BODIES.

1,287,454.   Specification of Letters Patent.   Patented Dec. 10, 1918.

Application filed July 1, 1915. Serial No. 37,527.

*To all whom it may concern:*

Be it known that I, ROBERT COOKE SAYER, engineer, a subject of the King of Great Britain and Ireland, residing at 11 Clyde road, Redland, Bristol, England, have invented certain new and useful Improvements in Connecting Bodies, of which the following is a specification.

This invention relates to improved means for connecting together a plurality of members or bodies.

One object of the invention is to provide improvements in connectors of the character shown and described in my British Patent No. 18000 of 1907, whereby one or more continuous annular inclines or wedges which may be formed integral with or separate from the bodies to be connected are so constructed that one continuous circular wedge composed of one or more parts shall act against another wedge or wedges to thrust the parts together direct; or the wedge or wedges be thrust to act similarly by coils of any material formed of rods or cords of any cross section; or the same be effected by combination of the two means.

Another object is to provide inclines or wedges of the character above set forth for action against other inclines or wedges entirely around a circle without the formation of angles and thus permit the coils and inclines to slip readily without cutting.

With these and other objects in view, the invention consists of certain novel features of construction, and the combination and arrangement of parts as will be hereinafter more fully described and claimed.

In the accompanying drawings:

Figure 1 represents a vertical transverse section taken on the line A—A of Fig. 2 showing a bolt for connecting railway chairs to their sleepers;

Fig. 2 is a horizontal section taken on the line B—B of Fig. 1;

Fig. 3 is a vertical section showing the invention applied to a rivet in three parts employed for connecting two plates;

Fig. 4 is a vertical section taken on the line C—C of Fig. 3;

Fig. 5 is a view similar to Fig. 3, showing one of the members in the act of being assembled;

Fig. 6 is a horizontal section taken on the line D—D of Fig. 3, the dotted lines showing the section on line D—D of Fig. 5;

Fig. 7 is a similar view taken on the line D—E—E—F of Fig. 3 showing the top of the right hand member in the act of being passed through the apertures in the plates after the left hand member has been inserted and before the insertion of the central plug;

Fig. 8 is a plan view taken on the line G—G of Fig. 3;

Fig. 9 is a plan view of a tubular rivet or button provided with two superimposed ring-like inclines for holding one plate while a second plate is placed over and attached by its coils as shown at H—H of Fig. 11;

Fig. 9ª is a perspective view of one of the sections of the bolt of this modified form;

Fig. 10 is a transverse section taken on the line I—I of Fig. 11; showing openings to receive the ends of the lower coils;

Fig. 11 is a section taken on the line J—J of Fig. 10;

Fig. 12 is a longitudinal section taken through a pipe joint; showing spring arch plates for receiving the coils and removable inner and outer packings;

Fig. 13 is a plan view taken at K—K of Fig. 12;

Fig. 14 is a transverse section taken on the line L—L of Fig. 12;

Fig. 15 is a sectional elevation of a pipe closed at one end showing this invention applied;

Fig. 16 is a section taken on the line M—M of Fig. 15;

Fig. 17 is a vertical section of a boiler tube for connection with a fire-box, said section being taken on the line N—N of Fig. 18;

Fig. 18 is an end elevation taken on the line O—O of Fig. 17;

Fig. 19 is a view similar to Fig. 3 showing the invention applied to a rivet connecting two plates without the use of coils;

Fig. 20 is a transverse section taken on the line P—P of Fig. 19, with the central plug or wedge removed and with a radial key inserted.

In the embodiment illustrated in Figs. 1 and 2 the invention is shown applied for connecting sleepers 1 of railways to chairs 2 by means of coils 3 which are coiled when either hot or cold around a ring or annular plate 4 having an inclined inner or lower face with the ends of the coils twisted together for securely holding them in operative position. The plate 4 is formed in two parts or sections, preferably connected by dowels 4'. The winding of the coils 3 around the member 4 thrusts the latter up from the chair 2 against the inner face of the head 6 of the bolt 5 carrying with it the fang plate 1ª and bolt 5. It is to be understood that the size and number of coils employed may be varied to produce the best result in each particular case.

In Figs. 3 to 8 a rivet or bolt is shown for connecting the plates 1 and 2 and comprises two similarly constructed sections 7 and 7', the inclines 4 of which are formed on the inner faces of one end of each of said sections and on a member 8 which is disposed between said sections to form a continuous annular incline as shown in Fig. 8.

In Fig. 5 one of the bolt sections is shown in the act of being placed in position, such section being inserted through the holes 9 in the plates 1 and 2 to be connected. To provide for the insertion of the other section 7' and member 8 the section 7 first inserted is slipped to the left a sufficient distance to permit the other section 7' to be inserted through the registering openings in the plates, the head thereof mainly occupying the space subsequently taken by the central portion of the winged wedge member 8 as is shown sectionally in Fig. 7. When the heads have been inserted through the openings 9 both sections 7 and 7' assume the position shown in Fig. 3 and the member 8, the wings of which complete the circular wedge 4, is driven while cold between the two sections 7 and 7' to tighten them against the side walls of the openings 9 in plates 1 and 2. The wedge 8 may then be clenched on the outer face of the bolt, having extensions 8' which are passed through a vent 25 in the bolt head and with their terminals upset against the outer face of said head as shown in Fig. 3 whereby the wedge is reliably held in its proper position. The coils 3 are wound within grooves 10 formed in the wedge 8 and around the three connected members 7, 7' and 8 and bear against the top of the plate 2 and the continuous annular inclines 4 whereby the heads of the members 7, 7' are thrust against the plate 1 and the coils 3 down against the plate 2 for drawing said plates together and rendering the subsequent retraction of the members 7, 7' from plates 1 and 2 impossible.

In the form illustrated in Figs. 9 to 11, two ring-like members 4 and 44 are shown composed of superimposed inclines formed on the bolt 5 which is constructed of two members as shown or made in one part with a central aperture 10 and side openings 11 and 12 for the reception of a wire or similar element 33. This element is passed through the opening 11 and after the bolt 5 has been inserted through the beveled opening in the plate 1 the element 33 is coiled around the incline 44 to press the plate 1 down and the bolt 5 up and said element 33 is then passed through the opening 12 and twisted around its other end for securely connecting it in operative position. The top plate 2 has an opening 9 which closely fits the bolt 5 which is driven therein hot or cold. Subsequently the upper coil 3 is passed through an opening 13 in the bolt 5 and secured. This coil 3 is then wound around the incline 4 pyramidally so as to bear on the plate 2 and press it down against plate 1 and thrust the incline 4 and bolt 5 up, the coil 3 being held by a twist as its securing means. When maximum strength is required the openings 9 in the plate 1 or in both plates 1 and 2 are made smaller than the bolt 5 at 4 and 44 and burred when punched to permit of their passing over the bolt 5 which when inserted is flattened under the inclines 4 and 44 by any suitable means.

Figs. 12, 13 and 14 show a joint connecting bodies 1 and 2 in the form of pipes which have annular lugs or flanges 14 and 15. Flanged ends 16 and 17 of any desired number of connecting members 5 engage the flanges 14 and 15, said members being arranged either singly or in groups as shown and carrying inclines 4 and 44 which may be spaced laterally any distance apart or disposed close to each other as desired. The members 5 are thrust apart by a plurality of separate plates 18 arranged in abutting relation to form a continuous ring or circle. These plates 18 are preferably in the form of springs one only being shown in Fig. 13 and they carry at their ends continuous annular inclines or bevels to fit and be thrust against the inclines 4 and 44 by the contracting action of the coils 3 to provide for the flanges 17, 15 and 16 and 14 to be reversely tightened against burnable or cutable packings 19 and another packing 20, against the flanges 14 and 15, the coils 3 may be twisted together either when cold or hot and allowed to contract.

One of the pipes 1 may be removed from the others by uncoiling the coils 3, removing the spring plates 18 and disengaging the flanges 16 and 17 of the members 5 and the packing 20, the packing 19, being burnt or cut to provide freedom. Another pipe 1 may be replaced without packing 19 as the packing 20 will prevent leakage.

In Figs. 15 and 16 a closed end pipe 2 is shown with the plates 18 omitted and with the coils 3 acting directly against the members 5 which have lugs or flanges 16 and 17 engaging with a flange 14 on pipe 2 and with the diaphragm closure 21 and thrusting the flange and diaphragm closure against the packings 19 and 20.

Figs. 17 and 18 show the invention applied for securing the ends of a boiler tube 1 to a fire box 2 in which an annular flange 14 on tube 1 limits the size of the opening in plate 2 and in certain boilers where the tube 1 is not passed through the plate 2 but is freed internally a lug or flange 15 which spans the opening 22 in said plate is also made annular. The coils 3 contract against a packing 24 and incline 4, flange 14 and plate 2 whereby all of them are thrust tightly together.

Figs. 19 and 20 show a rivet formed of a plurality of duplicate radially disposed segmental parts 7 in connection with two members 77 to provide for the reception of a key 26 having parallel sides to enable its head to be passed through the opening 9 as shown in Fig. 20. The segments 7 and 77 and the key 26 when in place form two superimposed continuous annular inclines 4 to engage the continuous annular inclines 44 formed in the plates 1 and 2 without any intermediate coil 3 being used. The parts 7—77 and 26 are then driven tightly against the plates 1 and 2 by a sectionally circular inclined or wedge-shaped plug 8, causing the incline 4 to tighten against the incline 44 and thereby thrust the plates 1 and 2 together and abut against them, and when desired the member 8 is clenched in operative engagement as shown in Fig. 19.

I claim:

1. In a device of the character set forth, the combination of a member having a continuous annular incline, a member having a continuous surface to oppose said incline, and annular means engaging said surfaces for forcing the members apart.

2. A device for connecting bodies comprising continuous annular inclines composed of a plurality of members and continuous ring-like inclines engaging said first mentioned inclines to hold the bodies to be connected firmly in contact.

3. A device of the class described comprising superimposed continuous annular inclines composed of a plurality of parts, and continuous annular inclines engaging said first mentioned inclines for thrusting the bodies to be connected into firm contact.

4. A device of the class described comprising superimposed continuous annular inclines composed of a plurality of parts, and continuous annular inclines engaging said first mentioned inclines for thrusting the bodies to be connected into firm contact, a superimposed body similarly connected, and means for attaching it to provide for its removal and reattachment without disturbance of the other bodies.

5. In a device of the character set forth the combination with a plurality of bodies to be connected, of a connecting member therefor having a continuous annular incline, and means coacting with the connecting member to render said incline effective in drawing the said bodies together.

6. In a device of the character set forth, the combination with a plurality of bodies to be connected of a connecting member having a continuous annular incline, adapted to form in the operative position of the connecting member an annular space of wedge-shape in cross section, and annular wedging means engaging in said wedge-shaped space to force the said bodies together.

7. In a device of the character set forth the combination with a plurality of bodies to be connected, of a connecting member of circular cross-section composed of circular segments and having a continuous annular incline adapted to form in the operative position of the connecting member an annular space of wedge-shaped cross section, and annular wedging means engaging in said wedge-shaped space to force the said bodies together.

8. In a device of the character set forth the combination with a plurality of bodies to be connected, of a connecting member of circular cross-section composed of circular segments and having a continuous annular incline adapted to form in the operative position of the connecting member an annular space of wedge-shaped cross-section, and a length of material adapted to be coiled in the said wedge-shaped space and capable of forming a wedge therein.

In testimony whereof I have affixed my signature, in presence of two witnesses.

ROBERT COOKE SAYER.

Witnesses:
  E. J. RUSSELL,
  H. WOODS.